Patented Dec. 8, 1925.

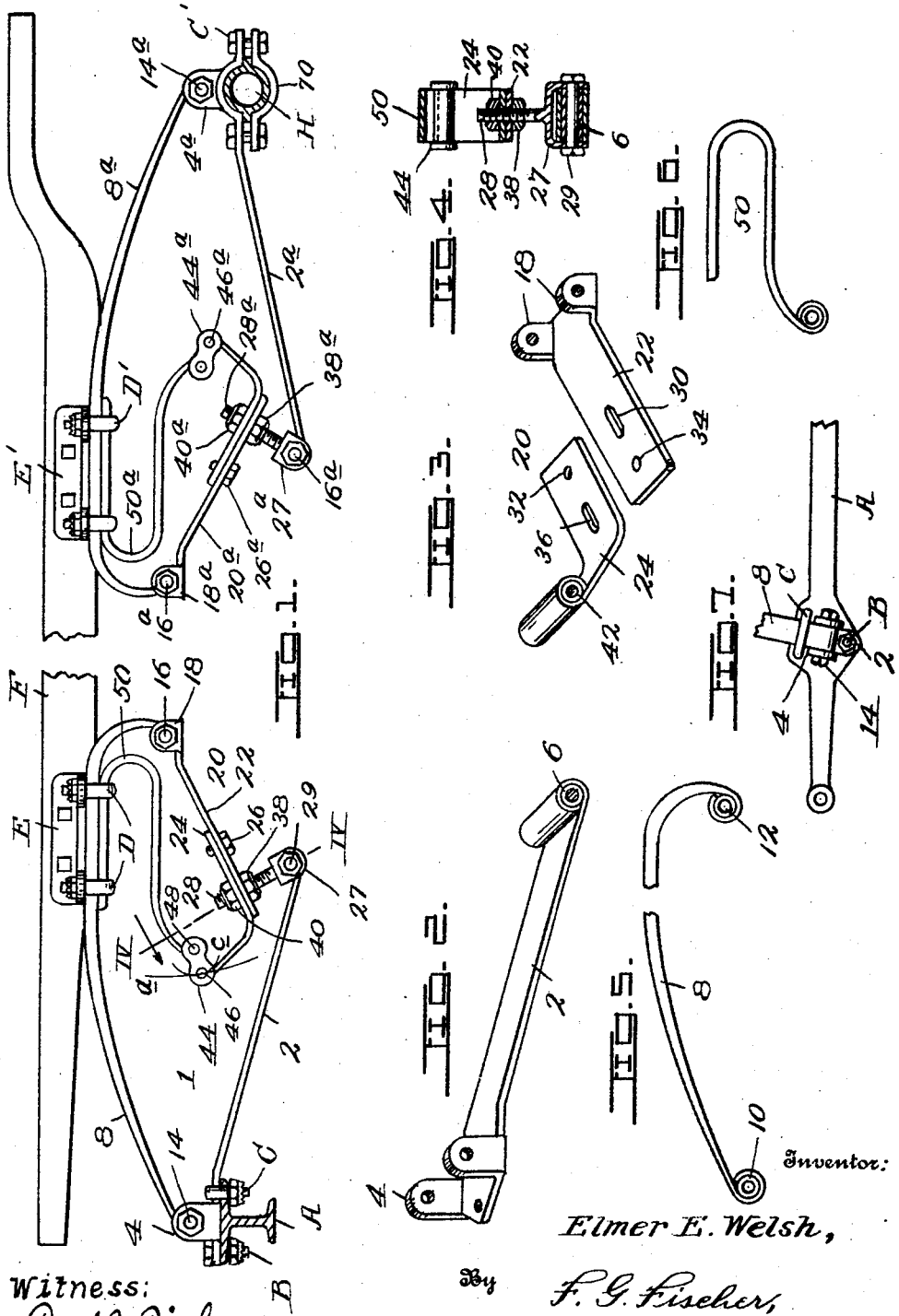

1,564,299

UNITED STATES PATENT OFFICE.

ELMER E. WELSH, OF LAWRENCE, KANSAS.

SHOCK-ABSORBING SPRING.

Application filed May 22, 1925. Serial No. 32,093.

*To all whom it may concern:*

Be it known that I, ELMER E. WELSH, a citizen of the United States, residing at Lawrence, in the county of Douglas and State of Kansas, have invented certain new and useful Improvements in Shock-Absorbing Springs, of which the following is a specification.

My invention relates to spring suspensions for motor vehicles and my object is to provide mechanism of this character combining the qualities of the usual springs with that of shock absorbers and radius rods, to the end that the passengers will be relieved of undue shock and vibration when the vehicle is traveling over a rough road.

In order that the invention may be fully understood, reference will now be had to the accompanying drawing, in which:

Fig. 1 is a broken side elevation of the axles and frame of a motor vehicle equipped with the invention.

Fig. 2 is a detail perspective view of an arm or radius rod constituting a portion of the invention.

Fig. 3 is a detail perspective view of a lever with its two sections disconnected.

Fig. 4 is a sectional view on line IV—IV of Fig. 1.

Fig. 5 is a detail side elevation of the main spring.

Fig. 6 is a detail side elevation of the auxiliary spring.

Fig. 7 is a broken plan view of the front axle, with the forward portion of one of the springs mounted thereon.

Referring more particularly to the front spring suspension 1, 2 designates a relatively rigid arm, or what I prefer to call a radius rod, which is provided at its forward end with a pair of upturned lugs 4 and at its rear end with a bushing 6. The forward end of the radius rod 2 is seated upon the front axle A, to which it is rigidly secured by bolts B and C.

8 designates the main spring which may consist of a single leaf as shown, or a plurality of leaves as preferred. Said spring 8 is of irregular arch formation and firmly secured near its rear end by U-bolts D to a bracket E, which is firmly secured to the side of the chassis F. The spring 8 is provided at its front and rear terminals with bushings 10 and 12, the former of which is operably mounted upon a pivot 14 extending through the upturned lugs 4.

The bushing 12 is mounted upon a pivot or fulcrum 16 extending through the upturned lugs 18 at the rear of a lever 20 consisting of two sections 22 and 24 adjustably connected by a screw 26 and a threaded shank 28. The screw 26 extends upwardly through a slot 30 in the section 22 and is threaded in a hole 32 in the section 24, while the shank 28 extends through a hole 34 in the section 22 and a slot 36 in the section 24. Lock nuts 38 and 40 are threaded on the shank 28 and firmly abut the sections 22 and 24, respectively, to secure said shank at any point of its adjustment. The foregoing arrangement permits the lever 20 to be shortened or lengthened to facilitate the assembly of the spring suspension and also for the purpose of taking up wear of the parts and adjusting them for different loads. The lower end of the threaded shank 28 is provided with a clevis 27 which is connected to the rear end of the radius rod 2 by a pivot 29 extending through the bushing 6.

The forward end of the lever 20 is provided with a bushing 42 connected to the forward ends of a pair of shackles 44 by a pivot 46. The rear ends of the shackles 44 are connected by a pivot 48 to the forward end of an auxiliary spring 50, which is of substantially U-shaped formation and firmly clamped to the underside of the main spring 8 by the U-bolts D.

With the parts constructed and assembled as shown and described, it is apparent that when the main springs 8 are depressed as the vehicle travels over minor irregularities in the road said main springs 8 tend to lengthen by flattening out and thereby slightly advance the pivotal points 14. This action slightly advances the front axle A relatively to the chassis F and causes the radius rods 2, each clevis 27, and the threaded shanks 28 to pull forwardly and upwardly upon the levers 20, causing them to move on an arc *a* struck from the center of fulcrums 16. The forward ends of the shackles 44 are forced upwardly by the levers 20 on an arc *c* struck from the center of the pivots 48 and exert little restraint on the main springs 8 due to the slight difference in the curvature at the point of coincidence of said arcs *a* and *c*. However, on meeting a major obstruction in the road, causing the main springs 8 to straighten out to a greater extent and the shackles 44 to swing upwardly to a greater degree the increasing divergence between the arcs $a$ and $c$ brings the auxiliary springs 50 into play to restrain undue lengthening of said main springs 8, so that the following rebound will be greatly diminished. The rebound of the main springs 8 is retarded as the front axle A moves backward relatively to the chassis F and causes the radius rods 2 to push downwardly upon the levers 20 through their respective connection with each clevis 27 and the shanks 28. As the levers 20 swing downwardly on their fulcrums 16 they swing the shackles 44 downwardly on the pivots 48 to a point where divergence of the arcs $a$ and $c$ will prevent further movement of the shackles on said pivots 48, whereupon the auxiliary springs 50 are brought into action to assist in retarding the rebound. From the foregoing it is apparent that major flexings of the springs is retarded by the combined action of the levers 20, the shackles 44, and the auxiliary springs 50, thereby avoiding undue shock to the passengers or damage to the vehicle.

The rapidity with which the shock absorbing elements respond to the major flexings of the main springs 8 is controlled more or less by the upward and downward pull of the radius rods 2 as applied to the levers 20, it being apparent that the nearer the shanks 28 of each clevis 27 are placed to the fulcrums 16, the greater power required to swing said levers 20, while the farther the shanks 28 are located from the fulcrums 16 the less power required to operate said levers.

Any tendency of the front axle A to rock and thereby interfere with the easy operation of the steering mechanism is overcome by the radius rods 2 and the main springs 8, because while said radius rods tend to pull upwardly on the pivots 29 when the main springs 8 flatten out, or push downwardly on said pivots 29 as the main springs 8 move back to normal position, the action of the latter counteracts the action of the former in so far as any tendency to rock the axle A is concerned.

By attaching each main spring 8 to only one point of the chassis F said springs may be arranged to converge rearwardly so that their rear ends will not be in the way of guiding the front wheels around a corner, while their forwardly diverging ends may be located close to said front wheels, thereby enabling a lighter front axle to be employed than when the springs are mounted closer to the center of the axle as is customary with the usual semielliptical springs having two points of connection with the chassis.

The rear spring suspension disclosed by Fig. 1, is in all substantial respects identical to the forward spring suspension 1, as indicated by corresponding numerals with exponents "a", the only difference being that the rear ends of the radius rods $2^a$ are curved to fit over the upper portion of the rear axle H to which the radius rods are firmly clamped by bolts C' and plates 70, which latter are curved to fit the under portion of said axle H. The radius rods $2^a$ relieve the main springs $8^a$ of substantially all driving stress, so that they will be free to perform their principal function of absorbing shocks and vibrations.

From the foregoing description it is apparent that I have provided spring suspension means embodying radius rods which relieve the main springs of driving stresses and prevent the forward axle from rocking, and while I have shown and described the preferred construction, combination and arrangement of parts I reserve the right to make such changes as properly fall within the spirit and scope of the invention as claimed.

Having thus described my invention, what I claim and desire to secure by Letters Patent, is:

1. In spring means for motor vehicles, a relatively rigid member fixed at one end to an axle of said vehicle and free at its opposite end, a spring fixed intermediate its ends to the vehicle chassis and operably connected at one end to the fixed end of said rigid member, and yieldable restraining means connected to the free end of said rigid member and to the spring and embodying means swingable through arcs of different radii to check the flexing of said spring.

2. In spring means for motor vehicles, a relatively rigid member fixed at one end to an axle of said vehicle and free at its opposite end, a spring fixed intermediate its ends to the vehicle chassis and operably connected at one end to the fixed end of said rigid member, and yieldable restraining means connected to the free end of said rigid member and to the spring and embodying a lever and a shackle swingable through arcs of different radii to check the flexing of said spring.

3. In spring means for motor vehicles, a relatively rigid member fixed at one end to an axle of said vehicle and free at its opposite end, a main spring fixed intermediate its ends to the vehicle chassis and operably connected at one end to the fixed end of said rigid member, an auxiliary spring fixed at its upper portion to said main spring, and yieldable mechanism connected to the free end of said rigid member and to said springs and embodying means swingable through arcs of different radii to coact with the auxiliary spring in checking the flexing of said main spring.

4. In spring means for motor vehicles, a relatively rigid member fixed at one end to an axle of said vehicle and free at its opposite end, spaced lugs projecting upwardly from the fixed end of said member, an arched spring fixed intermediate its ends to the vehicle chassis and operably connected at one end to the lugs of said rigid member, and yieldably restraining means pivotally connected to the free end of said rigid member and to the spring and embodying means swingable through arcs of different radii to check the flexing of said spring.

5. In spring means for motor vehicles, a relatively rigid member fixed at one end to an axle of said vehicle and free at its opposite end, a spring fixed intermediate its ends to the vehicle chassis and operably connected at one end to the fixed end of said rigid member, a lever operably connected to the other end of said spring and the free end of said rigid member, and means connected to said spring and the lever and embodying elements swingable through an arc of different radius than that of said lever to coact therewith in restraining the flexing of said spring.

6. In spring means for motor vehicles, a relatively rigid member fixed at one end to an axle of said vehicle and free at its opposite end, a spring fixed intermediate its ends to the vehicle chassis and operably connected at one end to the fixed end of said rigid member, a lever swingably connected at one end to the other end of said spring and operably connected to the free end of said member, an auxiliary spring connected to the chassis, and shackles pivotally connected to said lever and the auxiliary spring.

7. In spring means for motor vehicles, a relatively rigid member fixed at one end to an axle of said vehicle and free at its opposite end, a spring fixed intermediate its ends to the vehicle chassis and operably connected at one end to the fixed end of said rigid member, a lever consisting of two sections one of which is operably connected to the other end of said spring while the other section is operably connected to the free end of said member, means adjustably connecting the sections of said lever, an auxiliary spring connected to the chassis, and shackles pivotally connected to said lever and the auxiliary spring.

In testimony whereof I affix my signature.

ELMER E. WELSH